United States Patent [19]
Smith

[11] Patent Number: 5,170,879
[45] Date of Patent: Dec. 15, 1992

[54] SINGLE FILE CONVEYOR SYSTEM
[75] Inventor: Paul W. Smith, Forest, Va.
[73] Assignee: Simplimatic Engineering Company, Lynchburg, Va.
[21] Appl. No.: 683,266
[22] Filed: Apr. 10, 1991
[51] Int. Cl.$^5$ ............................................. B65G 47/12
[52] U.S. Cl. ..................................... 198/452; 198/454; 198/836.1
[58] Field of Search ............ 198/453, 452, 454, 465.4, 198/466.1, 735.3, 836.1, 389

[56] References Cited
U.S. PATENT DOCUMENTS

| | | | |
|---|---|---|---|
| 1,075,891 | 10/1913 | Ayars | 198/453 |
| 2,389,696 | 11/1945 | Stiles | 198/452 |
| 2,656,910 | 10/1953 | Kraus et al. | |
| 2,743,807 | 5/1956 | McKune | 198/454 |
| 2,911,088 | 11/1959 | Ingham, Jr. et al. | 198/389 |
| 3,310,151 | 3/1967 | Carter | 198/453 X |
| 3,592,324 | 7/1971 | Caunt | |
| 3,601,240 | 8/1971 | Dominici | |
| 3,610,396 | 10/1971 | Babunovic | |
| 4,146,467 | 3/1979 | Sauer et al. | |
| 4,252,232 | 2/1981 | Beck et al. | |
| 4,253,783 | 3/1981 | Lenhart | |
| 4,560,060 | 12/1985 | Lenhart | |
| 4,623,059 | 11/1986 | Agnew | 198/453 X |
| 4,669,604 | 6/1987 | Lenhart | |
| 4,768,643 | 9/1988 | Lenhart | |
| 4,889,224 | 12/1989 | Denker | |

FOREIGN PATENT DOCUMENTS

| | | | |
|---|---|---|---|
| 736793 | 6/1966 | Canada | 198/453 |
| 2331781 | 1/1975 | Fed. Rep. of Germany | 198/453 |
| 3637250 | 6/1987 | Fed. Rep. of Germany | 198/454 |

Primary Examiner—D. Glenn Dayoan
Attorney, Agent, or Firm—St. Onge Steward Johnston & Reens

[57] ABSTRACT

A conveyor is provided for producing a single file from a mass of articles comprising a conveyor surface, an article engager for engaging articles in the mass and transporting a single file of them off of the conveyor surface, and a guide rail mounted along the conveyor surface, the guide rail including a shifting portion for shifting articles toward the article engager, and a pressure relieving portion for relieving some of a back pressure on articles.

45 Claims, 5 Drawing Sheets

SINGLE FILE CONVEYOR SYSTEM

TECHNICAL FIELD

This invention generally relates to conveyors, and more specifically to apparatuses and methods for providing a single file from a mass of articles.

BACKGROUND ART

Single file conveyor systems are well known in the conveyor art. Some such systems form a single file from an incoming mass of articles, while others properly orient and align articles for downstream operations, and still others present articles at predetermined spaced intervals. By way of example, the following single file conveyor systems provide a variety of features for accomplishing a variety of single file functions.

U.S. Pat. No. 4,560,060 discloses a relatively simple converging sidewall design. Upstream of the converging sidewalls is a transfer mechanism including a porous foraminous belt for eliminating downed or misformed cans from the convergence.

U.S. Pat. No. 4,768,643 and its parent, U.S. Pat. No. 4,669,604, disclose a single diagonal deflector which creates a single file from an equilateral transverse row of articles. A deadplate having a diagonal leading edge holds the articles in the equilateral contiguous triangular configuration.

U.S. Pat. No. 3,610,396 includes oblique guides converging across a supply conveyor toward a single file delivery conveyor. The guides each include counterweighted yieldable bars which impart a kneading action to the articles upon convergence. A belt imparts spin to the articles to further prevent bridging.

U.S. Pat. No. 4,252,232 discloses a conveyor system having a vacuum belt for providing a single file from a recirculating mass of articles. The cans recirculate around between adjacent conveyors.

U.S. Pat. No. 4,253,783 discloses a waterfall single filer for articles with horizontal axes. The articles fall from an upper ramp into a stacked pyramid upon a lower ramp, and move over an action lip, down a cascade ramp and into a flow-out forming an ogee curve type of weir structure.

U.S. Pat. No. 2,656,910 discloses can deflector belts for moving articles from a main conveyor belt to auxiliary conveyor belts.

U.S. Pat. No. 3,592,324 discloses a device for arranging articles having major and minor dimensions into a single file. Article-feeding conveyors operate at different speeds to separate individual articles engagement upon a guide.

U.S. Pat. No. 3,601,240 discloses a barrier belt for permitting row-wise advancement of articles toward downstream conveyors and movable guides for alignment and orientation.

U.S. Pat. No. 4,889,224 discloses a device for aligning products comprising a plurality of belts in various alignment for intercepting and rotating misaligned products.

SUMMARY OF THE INVENTION

It is an object of this invention to provide a conveyor system for producing a single file from a mass of articles. It is another object of the invention to provide a conveyor system for reducing the incidence of jams during single filing. It is a further object of the invention to provide a guide rail contoured to provide a single file from a mass of articles. It is still another object of the invention to provide a conveyor system for transporting a single file of articles to a flange guide conveyor. It is a still further object of the invention to provide a conveyor system for producing a single file from a mass of PET bottles.

These and other objects are achieved by provision of a conveyor comprising a conveyor surface; an article engager for engaging articles in the mass and transporting a single file of them off of the conveyor surface, the article engager mounted at an angle to the conveyor; and a guide rail mounted along the conveyor surface, the guide rail including a shifting portion for shifting articles toward the article engager to create an accumulation, and a pressure relieving portion for relieving some of a back pressure on articles. In one embodiment of the conveyor a void-filling portion of the guide rail is also provided to fill voids in the accumulation of articles. In another embodiment a gap-filling portion of the guide rail is also provided to fill gaps in the single file of articles.

In another embodiment the guide rail additionally includes another pressure relieving portion. Another embodiment omits the pressure relieving guide rail portion but includes a flange guide conveyor for receiving a single file from the article engager. In other aspects, the invention relates to methods for producing a single file of articles in conjunction with each of the above devices, and to guide rails for achieving each of the above objects.

The invention and its particular features will become more apparent from the following detailed description considered with reference to the accompanying drawings.

DETAILED DESCRIPTION OF THE INVENTION

Figure 1:
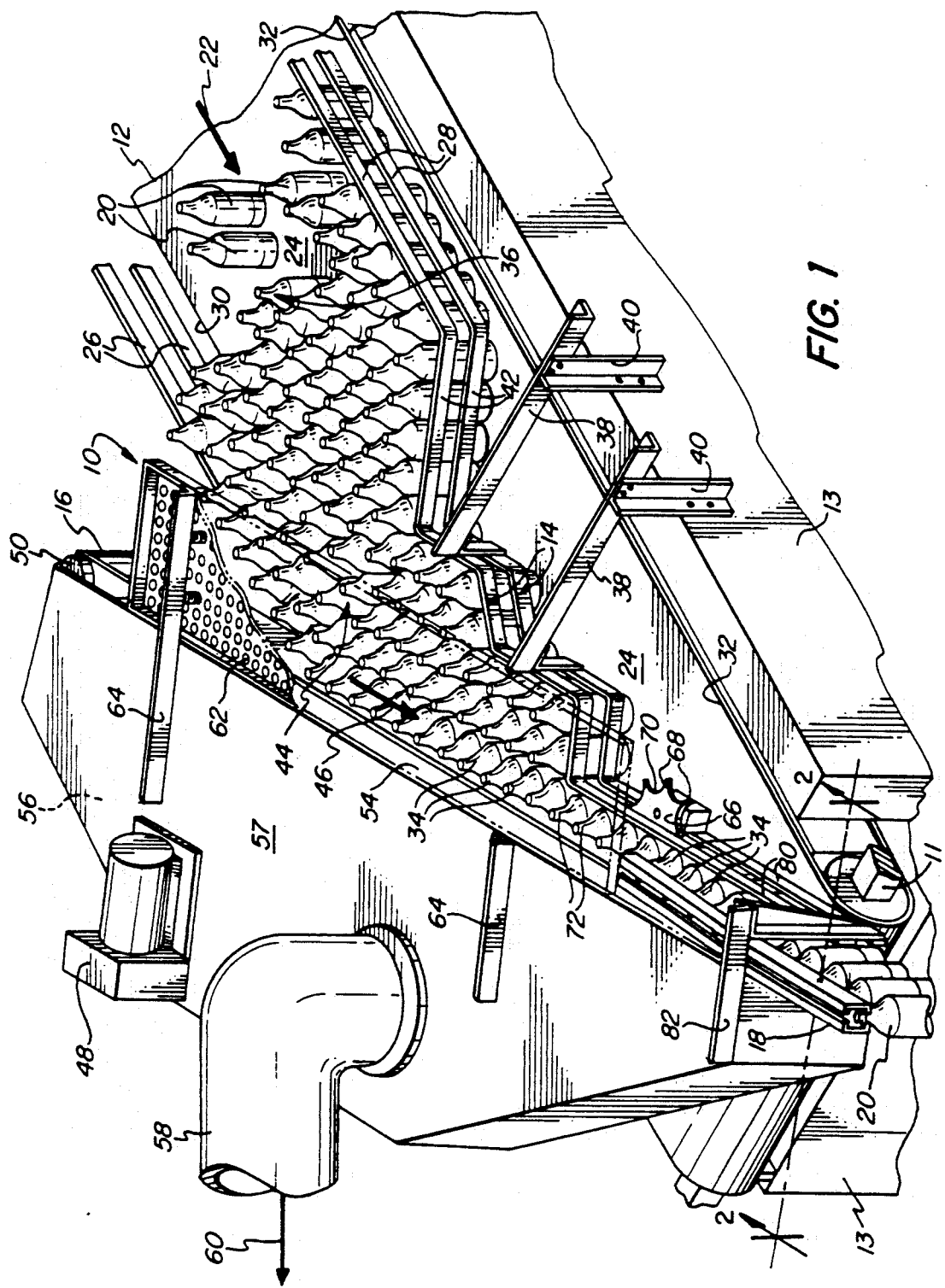
FIG. 1 is an isometric view of one embodiment of a conveyor in accordance with the invention.

A single file conveyor system 10, in accordance with this invention, is generally shown in an isometric view in FIG. 1. Conveyor system 10 is supported by a frame 13 and circulates about an axle and roller 11 which is supported by frame 13. Axle and roller 11 is energized by a motor (not shown in any Figure). Conveyor system 10 comprises a conveyor 12, a contoured guide rail 14, and means such as a vacuum take-off belt 16 for engaging and transporting articles in a single file. Conveyor system 10 may also include a flange or neck guide conveyor 18 for receiving a single file of articles from vacuum take-off belt 16 and transporting them further downstream.

Conveyor 12 conveys articles 20 along a conveyor path indicated by arrow 22 from a location further upstream which may, for example, include a machine for unloading articles 20 such as a palletizer/depalletizer, a machine for making articles 20, or the like. The type of conveyor 12 utilized is not critical, and will likely depend upon the type of articles 20 to be single filed, as well as the overall conveyor system environment. For articles such as PET bottles, conveyor 12 is preferably provided as an endless belt conveyor since the irregular bottoms of some PET bottles may render air conveyors rather ineffective. However, air conveyors may be used for articles such as cans which generally have more regularly shaped bottoms, and for other articles not likely to be tipped by jets of an air conveyor. In any event, conveyor 12 provides articles 20 along conveyor path 22 upon a conveyor surface 24 in a downstream direction. Guide rails 26 and 28 located at respective edges 30 and 32 of conveyor 12 help retain articles 20 upon conveyor surface 24 as they move downstream.

Contoured guide rail 14 comprises a number of guide rail portions each having an individual function in the preparation of a single file 34 of articles 20 from a mass 36 of articles delivered along conveyor path 22. Guide rail 14 is mounted above conveyor surface 24 by brackets 38 so as to permit conveyor 12 to convey articles 20 into contact with the various portions of guide rail 14. Brackets 38 are fastened to uprights 40 in turn mounted to conveyor frame 13 which supports conveyor system 10.

Portion 42 of contoured guide rail 14 extends across conveyor surface 24 at an angle to conveyor pathway 22 and serves to shift or direct articles 20 from near edge 32 of conveyor 12 in a direction substantially across the conveyor toward edge 30 or vacuum take-off belt 16. Guide rail portion 42 is aligned to converge with conveyor pathway 22 at an angle of preferably between about 30° and 60°, and most preferably at an angle of about 45°. However, almost any angle greater than 0° and less than 90° is possible depending upon the density and speed of mass 36 of articles conveyed along conveyor path 22 by conveyor 12. This shifting or directing of articles in a direction substantially across conveyor 12 is intended to produce an accumulation 44 of articles in the vicinity and downstream of guide rail portion 42. In this regard, generally the higher the density and speed of the mass of articles conveyed on conveyor 12, the shallower the alignment angle of guide rail portion 42 in order to provide such an accumulation 44 of articles. The functions of other portions of contoured guide rail 14 will be discussed below with reference to FIGS. 3 to 5.

Vacuum take-off belt 16 engages articles 20 from mass 36 of articles and transports them in single file 34 along a single file path indicated by arrow 46. Motor 48 circulates endless take-off belt 16 around axled rollers 50 (also see FIGS. 3 to 5). As shown, endless vacuum take-off belt 16 is preferably substantially vertically arranged and aligned in a direction substantially across conveyor 12 at an angle converging with conveyor pathway 22 preferably from between about 20° and 40° and, most preferably, about 30°. Further, endless vacuum take-off belt 16 is arranged most preferably on an opposite side of conveyor 12 from guide rail portion 42. Belt 16 preferably meets edge 30 of conveyor 12 approximately near an end 51 (not shown in this Figure, see FIGS. 3 to 5) of guide rail 26.

Figure 2:
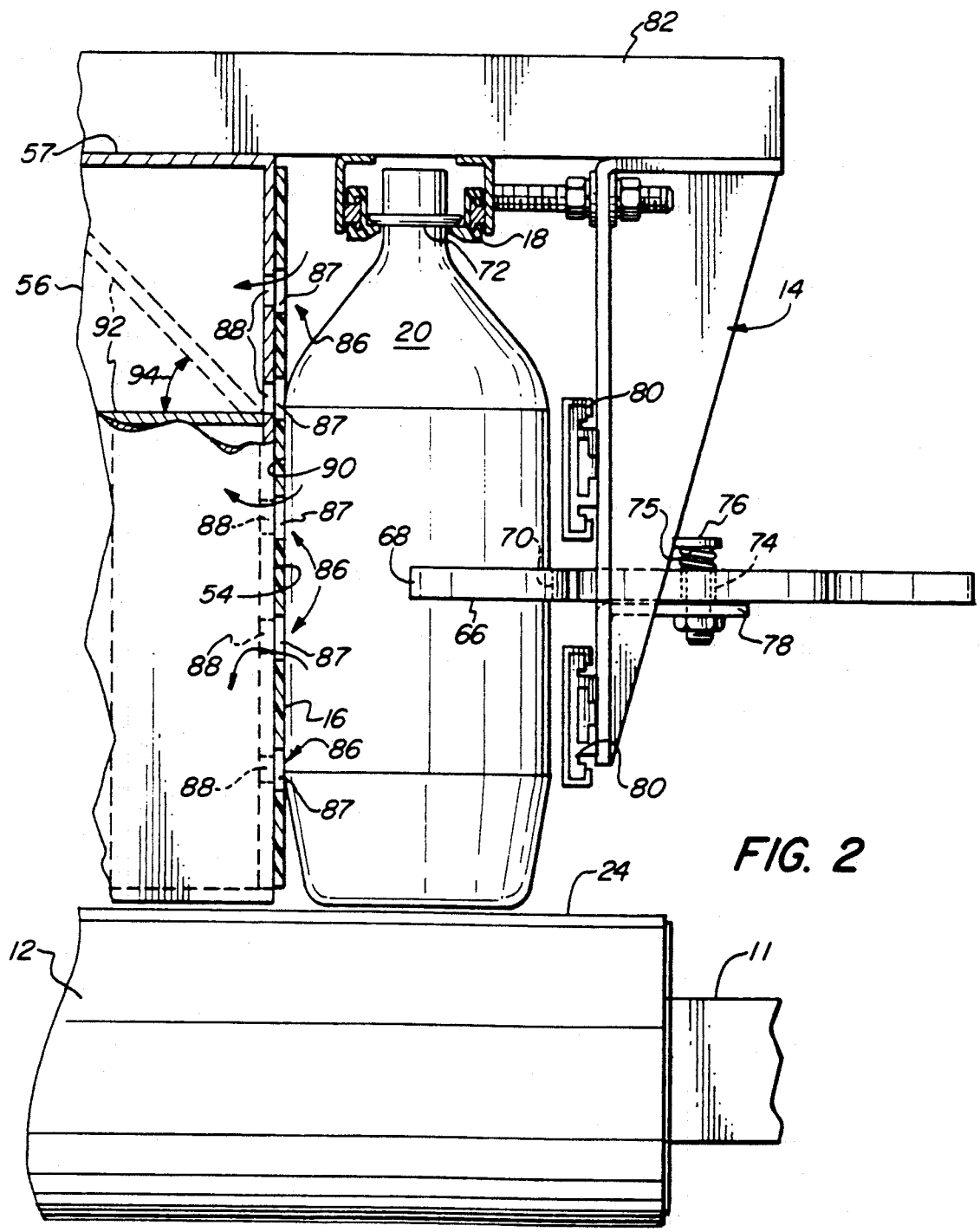
FIG. 2 is a cross section taken along the axis 2—2 of FIG. 1 depicting additional detail of the flange guide conveyor and the vacuum take-off belt of the conveyor of FIG. 1.

Endless vacuum take-off belt 16 slides along a perforated substantially vertical side surface 54 of a vacuum chamber 56 (also see FIG. 2). A vacuum pump (not shown in any Figure) connected to vacuum hose 58 creates a vacuum pressure within vacuum chamber 56 as indicated by arrow 60. Vacuum pressure 60 may range as high as five to eight or more inches of water. The operation of vacuum chamber 56 to engage or attract articles into a single file upon belt 16 is discussed below especially in conjunction with FIG. 2. A hold down plate 62, connected to a top surface 57 of vacuum chamber 56 by brackets 64, aids in the orderly single filing of articles 20 by preventing them from being propelled off conveyor surface 24. Brackets 64 may be provided with an air cylinder or like means (not shown) for raising hold down plate 62 to facilitate clearing a jam.

Where articles 20 are PET bottles or the like, single file 34 is preferably passed through a straightening wheel 66 and onto flange guide conveyor 18. Straightening wheel 66 includes spokes 68, successive ones of which form pockets 70 which are preferably shaped to match a cross section of articles 20. Thus, as articles 20 pass by straightening wheel 66, the article 20 is vertically straightened by aligning its cross section with pocket 70. Vertically straightened articles 20 of single file 34 are more easily passed to flange guide conveyor 18. Again in the case of PET bottles, flange guide conveyor 18 is preferably a neck guide conveyor which supports bottles beneath a neck flange 72.

In the case of articles 20 other than PET bottles, flange guide conveyor 18 leading to downstream operations may be replaced with any of a number of different conveyor types, and no means for vertically straightening articles may be necessary.

Referring now to FIG. 2, a cross section taken along axis 2—2 of FIG. 1, the arrangement of straightening wheel 66, neck guide conveyor 18, endless vacuum take-off belt 16 and conveyor 12 is depicted. Straightening wheel 66, including central bore 74, is mounted with a spring 75 and a nut and bolt combination 76 such that straightening wheel 66 is free to rotate. Spring 75 prevents free-wheeling of straightening wheel 66 and retains wheel 66 in position for receipt of a next article. Nut and bolt combination 76 is fastened to a platform 78 extending from a single file portion 80 of contoured guide rail 14. An overhead bracket 82 secures a single file portion 80 of guide rail 14 and flange guide conveyor 18 to top surface 57 of vacuum chamber 56 by, for example, welding or like means.

Vacuum take-off belt 16 preferably includes a plurality of rows 86 of perforations which are aligned with perforations 88 in substantially vertical perforated surface 54 of vacuum chamber 56. Belt 16 could also be made without perforations from a sufficiently air permeable material. Perforations 88 in surface 54 of vacuum chamber 56 preferably comprise slots running substantially the entire length of surface 54 over which articles 20 are transported; whereas, rows 86 of endless vacuum take-off belt 16 preferably comprise individual perforations 87 extending substantially completely the length of belt 16. Perforations 87 are preferably in the range of about 1/4 inch to 5/8 inches in diameter. Most preferably, perforations 87 are located along rows 86 at longitudinally spaced intervals of less than an article diameter In this way, belt 16 preferably may accept articles 20 at virtually any position therealong.

Vacuum pressure 60 acts as indicated by the arrows through perforations 87 and 88 to draw side surface 90 of articles 20 toward vacuum take-off belt 16 in order to separate a single file 34 of articles 20 from mass 36. Vacuum chamber 56 preferably includes a damper 92 movable as generally indicated by arrow 94 by a lever or the like (not shown in any Figure) to prevent vacuum pressure 60 from directly acting upon slots 88 in perforated surface 54 which are not necessary to draw a particular type of article toward belt 16. Thus, for example, a relatively shorter article such as a can or 16 oz. size PET bottle may only require that vacuum pressure 60 be applied to the three lowest slots 88 in order to effectively draw the article to vacuum take-off belt 16. As shown, however, a two-liter size PET bottle may require a vacuum pressure through all five slots 88 located within surface 54 in order to effectively draw the bottle to vacuum take-off belt 16.

As alluded to above, vacuum take-off belt 16 is but one means for engaging and transporting single file 34 away from mass 36 of articles Other means include vertical belts or bands without vacuum pressure, various horizontal conveyors including belts or bands with or without vacuums, air tables, and the like. As with the selection of conveyor 12, the selection of take-off belt 16 will likely depend upon the particular type of articles 20 to be single filed as well as the overall conveyor system environment.

Figure 3:
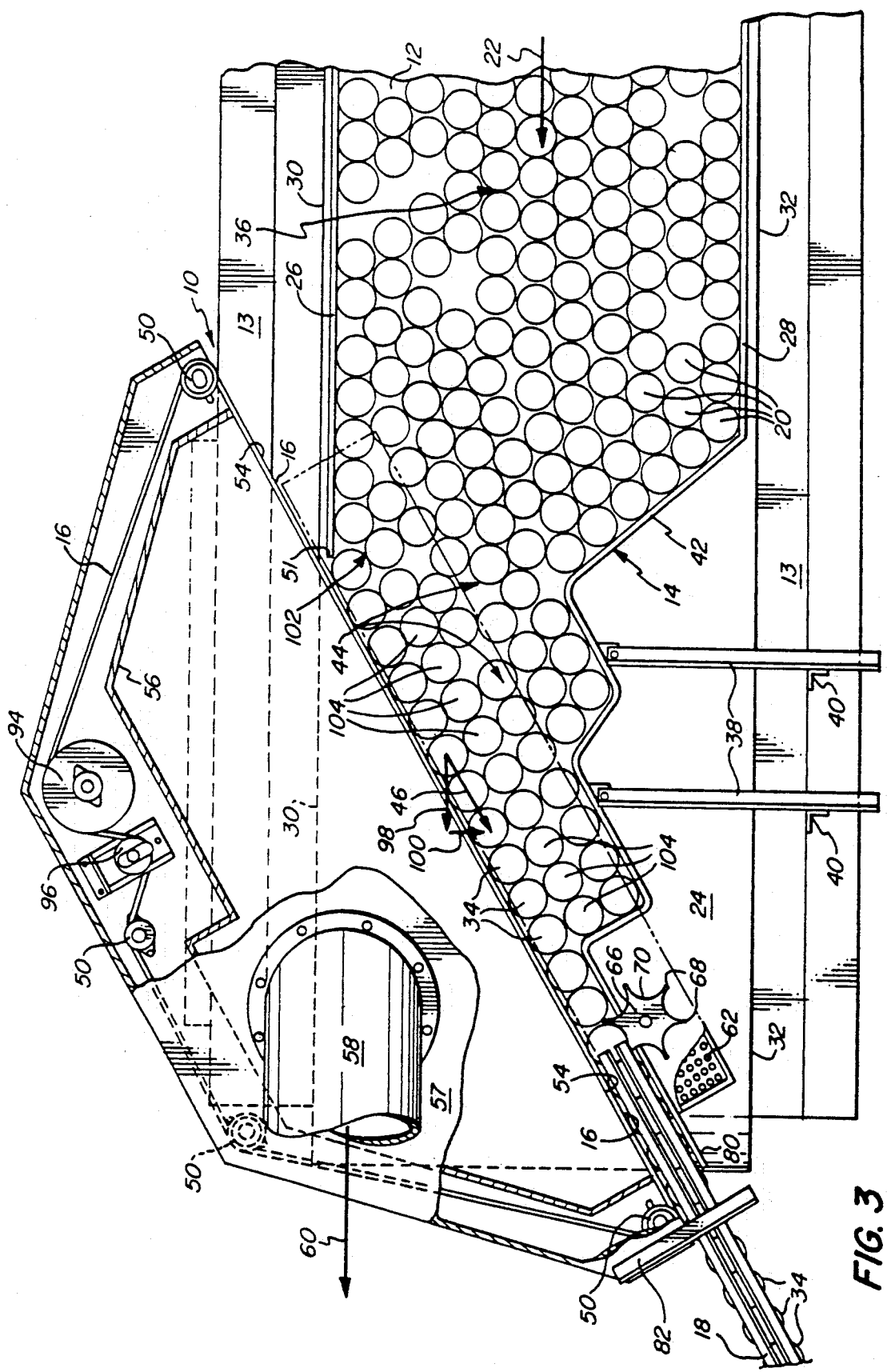
FIG. 3 is a top plan view of the conveyor of FIG. 1 revealing additional detail.

Referring now to FIG. 3, a top plan view reveals additional detail of conveyor system 10. Belt 16 advances across perforated surface 54 of vacuum chamber 56 and is circulated around axled rollers 50 by energized roller 94. Energized roller 94 is operatively coupled to motor 48 (see FIG. 1). For smooth start-up, motor 48 may be provided with a variable frequency control. A belt tensioner 96 preferably is also provided.

The velocity of belt 16 along single file path 46 may range as high as 500 feet/minute or higher. Belt 16 velocity includes a component indicated by arrow 98 parallel to conveyor path 22 as well as a component indicated by arrow 100 perpendicular to conveyor path 22. Component 98 of belt 16 velocity is preferably greater than the velocity of conveyor 12. Most preferably, component 98 is at least about a factor of ten times greater than conveyor 12 velocity Component 98 can be as large as a factor of thirty times greater than conveyor 12 velocity.

In operation, a majority of articles 20 forming single file 34 are drawn by vacuum pressure 60 to belt 16 from a take-off area 102 near end 51 of guide rail 26. In this regard, articles 20 near edge 30 of conveyor 12 may be conveyed relatively unimpeded along guide rail 26 substantially directly toward take-off belt 16. Once articles 20 are drawn to and engaged by belt 16 into single file 34, they are transported along single file path 46 and bump or slide along a row 104 of gap-filling articles.

Figure 4:
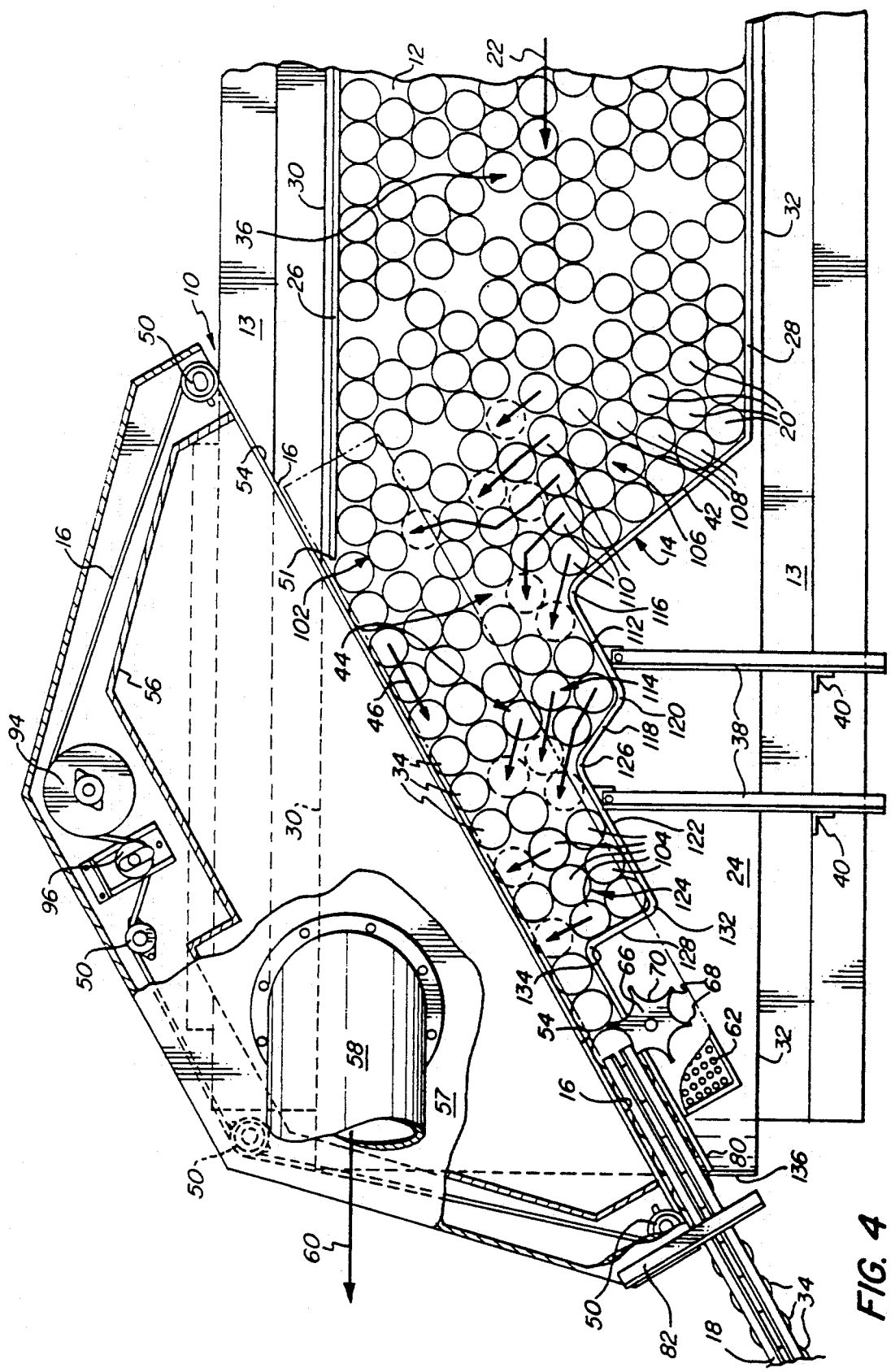
FIGS. 4, 5 are top plan views schematically depicting operation of the conveyor of FIG. 1 including the accumulation of articles, void filling in the accumulation and gap filling in the single file.

Referring now to FIG. 4, additional details of operation are depicted including creating accumulation 44 of articles, filling voids in accumulation 44, and filling gaps in single file 34. As discussed above in conjunction with FIG. 1, portion 42 of guide rail 14 shifts or directs articles 20 substantially across conveyor 12 at an angle to conveyor path 22 to form accumulation 44. Accumulation 44 forms despite the removal of articles by belt 16 from mass 36 at take-off area 102. Articles 20 shifting along guide rail portion 42 may form a substantially triangular pattern 106 substantially as illustrated.

Where articles 20 do form a substantial triangular pattern 106, ones conveyed along guide rail 28 fill an upstream side 108 of triangular pattern 106. In turn, articles 20 from downstream side 110 of triangular pattern 106 accumulate in area 44. As articles 20 in accumulation 44 are consolidated to occupy regions, indicated by dashed lines, which are closest to take-off area 102, articles from downstream side 110 of triangular pattern 106 are shifted to occupy both regions vacated by those articles being consolidated, as well as additional regions indicated by dashed lines The regions indicated by dashed lines represent open areas within accumulation 44 which are large enough to receive an article A portion 112 of contoured guide rail 14, located downstream of guide rail portion 42, functions to aid in relieving a back pressure which builds up upon articles located within accumulation 44 and along guide rail portion 42. "Back pressure" means the force applied by the mass 36 of relatively upstream articles being substantially continuously conveyed against relatively downstream articles Guide rail portion 112 extends across conveyor surface 24 toward edge 32, and is preferably aligned substantially parallel with single file path 46. The alignment of guide rail portion 112 back toward edge 32 creates a region 114 of relatively lower back pressure preventing articles 20 in the region from being forcibly pressed together and thus permitting them to move more freely Guide rail portion 112 is preferably connected to guide rail portion 42, most preferably by a rounded corner 116.

A portion 118 of contoured guide rail 14, located downstream of guide rail portion 42, functions to facilitate filling voids, indicated in dashed lines, within accumulation 44. Guide rail portion 118 is most preferably connected to guide rail portion 112, and most preferably by a rounded corner 120. Guide rail portion 118 extends across conveyor surface 24 toward edge 30 or take-off belt 16 at an angle converging with the conveyor path of between about 20 and 40 degrees, and most preferably at a converging angle of about 30°. Further, guide rail portion 118 is preferably aligned at a converging angle of about 60° to single file path 46 and take-off belt 16. The alignment of guide rail portion 118 not only provides a substantially packed pattern of articles in region 114, but also provides a funneling type function for urging articles to fill voids within accumulation 44 as indicated by the arrows. "Nested" patterns are well known in the art for arranging round articles as densely as possible on pallets and the like.

Figure 5:
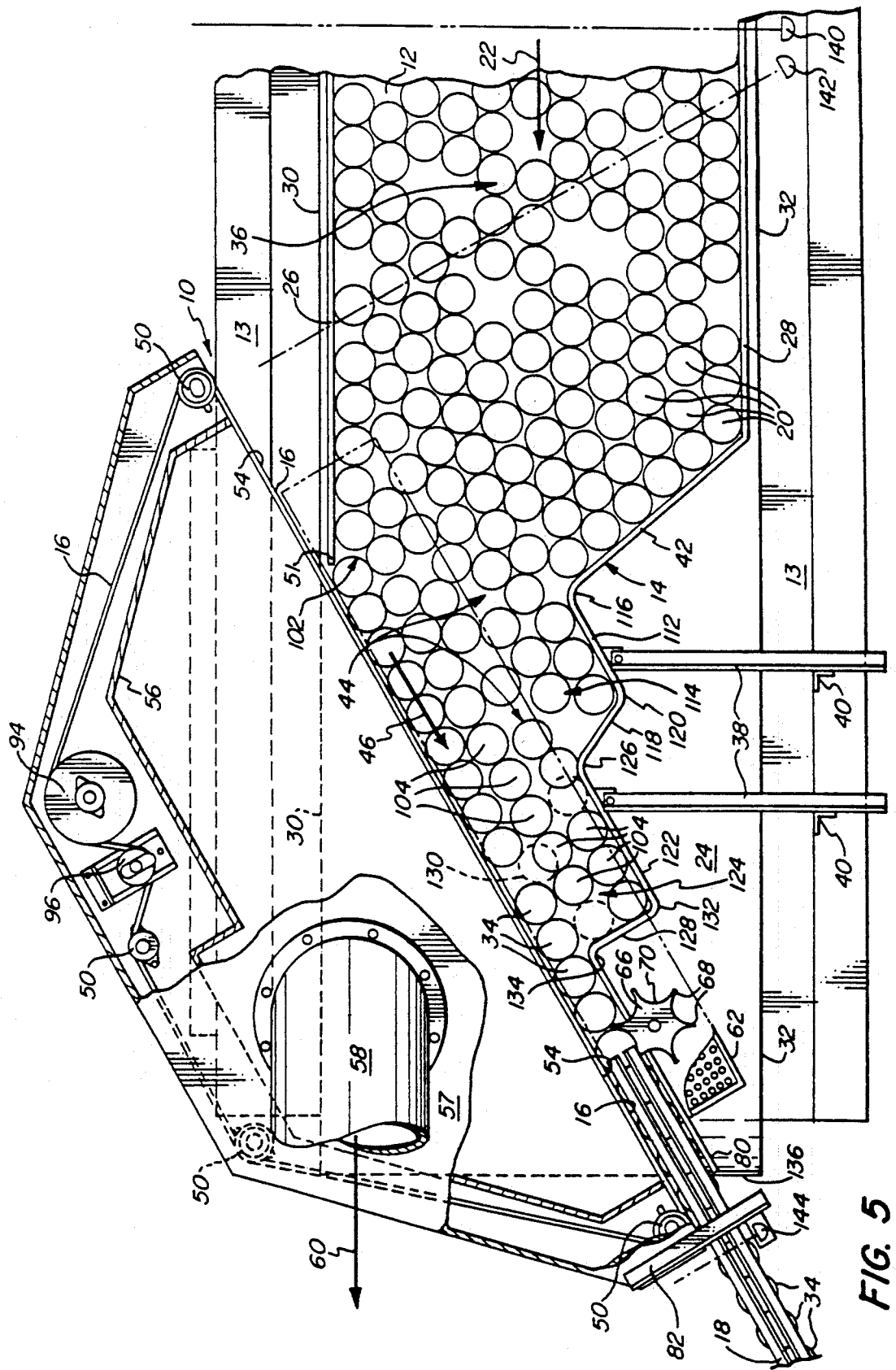

Referring briefly to FIG. 5, the funneling function of guide rail portion 118 is fulfilled in part by both the "nested" pattern of articles in region 114, as well as the relatively small converging angle with the conveyor path, which most preferably is matched by take-off belt 16. Larger converging angles with the conveyor path, such as that provided for guide rail portion 42, provide more of a blocking function substantially preventing articles from moving downstream as much as they move across conveyor 12. The smaller converging angle of guide rail portion 118, however, permits substantially more downstream than across conveyor movement of articles 20. Finally, the reduced back pressure in region 114 prevents forced funneling or forced void filling which might lead to jams Instead, articles 20 are merely urged or encouraged to fill voids, and while articles may be squeezed into position to fill voids, only a limited amount of back pressure is available for this purpose so as to limit both potential damage to articles 20 as well as possible article jams. The arrow connects initial and final positions of a squeezed article.

Returning to FIG. 4, similar to guide rail portion 112, most preferably another portion 122 of contoured guide rail 14, located downstream of guide rail portion 42, functions to aid in relieving back pressure. Guide rail portion 122 extends across conveyor surface 24 toward edge 32, and is preferably aligned substantially parallel with single file path 46. The alignment of guide rail portion 122 back toward edge 32 creates another region 124 of relatively lower back pressure preventing articles 20 in the region from being forcibly pressed together and thus permitting them to move more freely. Guide rail portion 122 is most preferably connected to guide rail portion 118, most preferably by a rounded corner 126.

A portion 128 of contoured guide rail 14, located downstream of guide rail portion 122, functions to facilitate filling gaps, indicated in dashed lines, within single file 34. Guide rail portion 128 extends across conveyor surface 24 toward edge 30 at an angle substantially perpendicular to take-off belt 16. The alignment of guide rail portion 128 provides at least one and preferably two substantially parallel rows 104 of gap-filling articles, each substantially parallel to single file 34 of articles. In this regard, the distance between take-off belt 16 and guide rail portion 122 is preferably about a whole number of article 20 diameters, and most preferably about three article diameters. For gaps, indicated in dashed lines, within single file 34 large enough to accommodate an entire article 20, articles from gap-filling row 104 will be drawn by vacuum pressure 60 (see FIG. 2) toward vacuum take-off belt 16 to fill the gap as indicated by the arrows.

Referring now to FIG. 5 again, in addition to being aligned substantially perpendicular to take-off belt 16, guide rail portion 128 is also aligned at a relatively large converging angle with conveyor path 22. Thus, guide rail portion 128 performs more of a "blocking" than a "funneling" function, and ordinarily will not urge or encourage articles in gap-filling row 104 to attempt to squeeze into openings in single file 34 not large enough to receive an entire article 20. As indicated by dashed article 130, articles in gap-filling row 104 attempting to fill too small a gap will simply be bumped back into position as single file 34 slides past Guide rail portion 128 is preferably attached to guide rail portion 122, most preferably by a rounded corner 132.

Single file guide rail portion 80 (see FIG. 2), located downstream of guide rail portion 128, functions simply to hold articles 20 in single file 34 against take-off belt 16. Single file guide rail portion 80 extends across conveyor surface 24, toward edge 32 and an end 136 of conveyor surface 24, substantially parallel to single file path 46. Single file guide rail portion 80 is preferably connected to guide rail portion 118 or 128, most preferably by rounded corner 134.

Operation of conveyor system 10 may be controlled by sensors 140, 142 and 144. Sensor 140 is a high level alarm which may be used to halt upstream flow of articles to minimize excessive back pressure Sensor 142 is a low level alarm which may be used to halt operation of conveyor system 10 when the relatively small number of articles on conveyor surface 12 may cause jams. Sensor 144 is a jam detector which may also be used to halt operation of conveyor system 10 when single file 34 is not moving along flange guide conveyor 18. Sensors 140, 142 and 144 may be provided as photo eyes or the like.

As depicted in FIGS. 3 to 5, the various angles and alignments of portions of contoured guide rail 14 and vacuum belt 16 are approximately correct Further, as depicted in these Figures, each portion of contoured guide rail 14 has a length approximately equal to a whole number of article diameters. The combination of portions 42, 112, 118, 122, 128 and 80 of contoured guide rail 14 comprise a most preferred embodiment of the invention. It is understood, however, that combinations of fewer portions of contoured guide rail 14 provide single filing advantages over prior art devices and constitute additional embodiments of the invention. For example, portion 80 may be omitted, and/or portions 128, 122 and/or 112 may be omitted, or portions 112, 118 and/or 122 may be omitted. Other combinations are possible and comprise additional embodiments.

Although the invention has been described with reference to particular embodiments, features and the like, these are not intended to exhaust all possible features, and indeed many other modifications and variations will be ascertainable to those of skill in the art.

What is claimed is:

1. A single filer for forming a mass of articles, the articles having circumferentially extending flanges, into a single file, comprising:

a conveyor surface for conveying articles in a mass along a conveyor pathway;

means for engaging articles in the mass, and for transporting engaged articles away from the mass in a single file along a single file path aligned at an angle to the conveyor path, at least a portion of said engaging means mounted above and extending across said conveyor surface;

means for shifting articles on aid conveyor surface toward said engaging means to create an accumulation of articles;

a flange guide conveyor, located along the single file path downstream of said engaging, means, for receiving and supporting articles beneath the flanges for transport in a single file from said engaging means;

said engaging means comprising a vacuum take-off belt, said vacuum take-off belt substantially vertically aligned to receive a side surface of articles; and a vacuum chamber having a perforated surface across which said vacuum take-off belt advances along the single file path, said vacuum chamber including a damper for limiting perforations through which a vacuum is applied by said vacuum chamber to said vacuum take-off belt.

2. The single filer of claim 1 wherein aid shifting means comprises a guide rail mounted above and extending at least partially across said conveyor surface toward said engaging means at an angle to the conveyor pathway.

3. The single filer of claim 1 comprising means for vertically straightening articles moving in the single file.

4. The single filer of claim 3 wherein said vertically straightening means comprises a wheel substantially horizontally mounted adjacent said vacuum take-off belt, said wheel having spokes defining pockets matching a cross section of the articles, and said vacuum take-off belt presenting a single file of articles into engagement with successive pockets of said wheel whereby said articles are substantially vertically aligned for receipt by said flange guide conveyor.

5. A conveyor for providing a single file from a mass of articles, comprising:

a conveyor surface for conveying articles along a conveyor path;

means for engaging articles in the mass and for transporting a single file of them off of said conveyor surface, at least a portion of said engaging means mounted above said conveyor surface and extending along a single file path across said conveyor surface at an angle to the conveyor path; and a first guide rail mounted along said conveyor surface, said first guide rail comprising a first portion for shifting articles from near a first edge of said conveyor surface toward said engaging means to create an accumulation of articles for transport by said engaging means, said first portion extending across said conveyor surface at an angle to the conveyor path, a second portion, located downstream from said first portion, for aiding to fill voids in the accumulation of articles, said second portion extending across said conveyor surface at an angle to the conveyor path of between about 20 and 40 degrees, a third portion, located further downstream from said second portion, for filling gaps in the single file of articles transported off of the conveyor surface by said engaging means, said third portion extending across said conveyor surface at an angle substantially perpendicular to the single file path, and a fourth portion, located downstream of said first portion, for relieving some of a back pressure on articles in the accumulation, said fourth portion extending across the conveyor surface toward the first edge.

6. The conveyor of claim 5 comprising a second guide rail mounted near a second edge of said conveyor surface, said second guide rail aligned substantially parallel with the conveyor path and terminating near said engaging means.

7. The conveyor of claim 5 wherein said fourth portion is aligned substantially parallel with the single file path.

8. The conveyor of claim 5 wherein said first guide rail comprises a fifth portion located between said second and third portions, said fifth portion extending across the conveyor surface toward the first edge.

9. The conveyor of claim 8 wherein said fifth portion is aligned substantially parallel with the single file path.

10. The conveyor of claim 8 wherein said first guide rail comprises a sixth portion connected to said third portion and extending downstream aligned substantially parallel with the single file path.

11. The conveyor of claim 10 wherein at least two of said first to sixth portions of said first guide rail are connected together by a rounded corner.

12. The conveyor of claim 5 comprising a third guide rail mounted upstream of said first guide rail near the first edge of said conveyor surface and aligned substantially parallel with the conveyor path.

13. The conveyor of claim 12 wherein said first and third guide rails are connected by a rounded corner.

14. The conveyor of claim 5 comprising means for moving said engaging means along the single file path at a speed greater than said conveyor surface moves along the conveyor path.

15. The conveyor of claim 5 wherein said engaging means comprises a vacuum take-off belt 16. The conveyor of claim 15 wherein said vacuum take-off belt is substantially vertically aligned and receives a side surface of articles 17. The single filer of claim 15 comprising a vacuum chamber having a perforated surface across which said vacuum take-off belt advances along the single file path, said vacuum chamber including a damper for limiting perforations to which a vacuum is applied by said vacuum chamber to said vacuum take-off belt 18. The conveyor of claim 15 wherein said vacuum take-off belt includes perforations, and wherein said perforations are spaced at longitudinal intervals of less than an article diameter.

19. The conveyor of claim 8 wherein a distance between said fifth portion and said engaging means is approximately equal to a sum of three article diameters.

20. A conveyor for providing a single file from a mass of articles, comprising:

a conveyor surface for conveying articles along a conveyor path;

means for engaging articles in the mass and for transporting a single file of them off of said conveyor surface, at least a portion of said engaging means mounted along a single file path at an angle to the conveyor path; and a first guide rail mounted along said conveyor surface, said first guide rail comprising a first portion for shifting articles from near a first edge of said conveyor surface toward said engaging means to create an accumulation of articles for transport by said engaging means, said first portion extending across said conveyor surface at an angle to the conveyor path, a second portion, located downstream from said first portion, for filling gaps in the single file of articles transported off of the conveyor surface by said engaging means, said second portion extending across said conveyor surface at an angle substantially perpendicular to the single file path, and a third portion, located between said first and second portions, for relieving some of a back pressure on the articles created by the article accumulation, said third portion extending across the conveyor surface toward the first edge.

21. The conveyor of claim 20 wherein said third portion is aligned substantially parallel with the single file 22. The conveyor of claim 21 wherein a distance between said third portion and said engaging means is approximately equal to a sum of three article diameters.

23. The conveyor of claim 20 wherein said engaging means comprises a vacuum take-off belt.

24. The conveyor of claim 23 wherein said vacuum take-off belt is substantially vertically aligned and receives a side surface of articles.

25. The conveyor of claim 24 comprising means for vertically straightening articles moving in the single file.

26. The conveyor of claim 25 wherein said vertically straightening means comprises a wheel substantially horizontally mounted adjacent said vacuum take-off belt, said wheel having spokes defining pockets matching a cross section of the articles, and said vacuum take-off belt presenting a single file of articles into engagement with successive pockets of said wheel.

27. A conveyor for providing a single file from a mass of articles, comprising:

a conveyor surface for conveying articles along a conveyor path;

means for engaging articles in the mass and for transporting a single file of them off of said conveyor surface, at least a portion of said engaging means mounted along a single file path at an angle to the conveyor path; and a first guide rail mounted along said conveyor surface, said first guide rail comprising
a first portion for shifting articles from near a first edge of said conveyor surface toward said engaging means to create an accumulation of articles for transport by said engaging means, said first portion extending across said conveyor surface at an angle to the conveyor path,
a second portion, located downstream from said first portion, for aiding to fill voids in the accumulation of articles, said second portion extending across said conveyor surface at an angle to the conveyor path of between about 20 and 40 degrees, and
a third portion, located between said first and second portions, for relieving some of a back pressure on the articles created by the article accumulation, said third portion extending across the conveyor surface toward the first edge.

28. The conveyor of claim 27 comprising a second guide rail mounted near a second edge of said conveyor surface, said second guide rail aligned substantially parallel with the conveyor path and terminating near said engaging means.

29. The conveyor of claim 28 comprising a third guide rail mounted upstream of said first guide rail near the first edge of said conveyor surface and aligned substantially parallel with the conveyor path.

30. The conveyor of claim 29 comprising means for moving said engaging means along the single file path at a speed greater than said conveyor surface moves along the conveyor path.

31. The conveyor of claim 30 wherein said third portion is aligned substantially parallel with the single file path.

32. The conveyor of claim 31 wherein said first guide rail comprises a fourth portion connected to said second portion and extending downstream aligned substantially parallel with the single file path.

33. The conveyor of claim 32 wherein said engaging means comprises a vacuum take-off belt.

34. The conveyor of claim 33 wherein said vacuum take-off belt is substantially vertically aligned and receives a side surface of articles.

35. The conveyor of claim 34 wherein aid vacuum take-off belt includes perforations, and wherein said perforations are spaced at longitudinal intervals of less than an article diameter.

36. A method of providing a single file from a mass of articles, comprising the steps of
conveying a mass of articles along a conveyor path;
forming an accumulation of articles by guiding some articles from eh mass in a direction converging wit the conveyor path;
forming a single file of articles by engaging articles from he mass;
conveying the single file of articles away from the mass of articles along a single file path;
relieving a back pressure on articles in the accumulation by guiding some articles in he accumulation of articles in a direction diverging with the conveyor path; and
filling gaps in the single file of articles by guiding some articles from the accumulation of articles in a direction substantially perpendicular to the single file path.

37. The method of claim 36 comprising the additional step of filling voids in he accumulation of articles by arranging at least some o the articles in the accumulation into a nested pattern.

38. The method of claim 37 wherein said single file forming and conveying steps comprise drawing articles toward a take-off belt with a vacuum and advancing the take-off belt to remove articles from the mass.

39. The method of claim 38 comprising the additional step of vertically straightening articles conveyed in single file by the take-off belt.

40. The method of claim 39 comprising the additional step of depositing articles from the take-off belt onto a flange guide conveyor.

41. A contoured guide rail for producing a single file from a mass of articles provided by a conveyor along a conveyor path, comprising:
a first guide rail portion for shifting articles substantially across the conveyor to create an accumulation of articles, said first guide rail portion extending across the conveyor at an angle to the conveyor path,
a second guide rail portion, located downstream from said first guide rail portion, for aiding to fill voids in the accumulation of articles, said second guide rail portion extending across the conveyor at an angle to the conveyor path of between about 20 and 40 degrees, and
a third guide rail portion, located further downstream from said second guide rail portion, for filling gaps in a single file of articles arranged along a single file path aligned at an angle to the conveyor path, said third guide rail portion extending across the conveyor at an angle substantially perpendicular to the single file path.

42. The guide rail of claim 41 comprising a fourth guide rail portion, located downstream of said first guide rail portion, for relieving some of a back pressure on the articles created by the article accumulation, said fourth guide rail portion extending across the conveyor aligned substantially parallel with the single file path.

43. The guide rail of claim 42 wherein said fourth guide rail portion is located between said first and second guide rail portions.

44. The guide rail of claim 43 comprising a fifth guide rail portion located between said second and third guide rail portions, said fifth guide rail portion extending across the conveyor aligned substantially parallel with the single file path.

45. A method of providing a single file from a mass of articles, comprising the steps of
conveying a mass of articles along a conveyor path;
forming an accumulation of articles by guiding some articles form the mass in a direction converging with the conveyor path;
forming a single file of articles by engaging articles from the mass;
conveying the single file of articles away from the mass of articles along a single file path;
filling gaps in the single file of articles by guiding some articles from the accumulation of articles in a direction substantially perpendicular to the single file path; and
filling voids in the accumulation of articles by arranging at least some of the articles in the accumulation into a nested pattern; and
wherein said single file conveying step comprises drawing articles toward a take-off belt with a vacuum and advancing the take-off belt to remove articles from the mass.

* * * * *